United States Patent
Chibata et al.

[15] 3,652,402
[45] Mar. 28, 1972

[54] ASPARAGINASE HAVING ANTITUMOR ACTIVITY AND PROCESS FOR PREPARING THE SAME

[72] Inventors: Ichiro Chibata, Suita-shi; Tetsuya Tosa, Kyoto-shi; Ryujiro Sano, Takatsuki-shi; Katsuko Ando, Toyonaka-shi, all of Japan

[73] Assignee: Tanabe Seiyaku Co., Ltd., Osaka, Japan

[22] Filed: Aug. 27, 1969

[21] Appl. No.: 853,496

[30] Foreign Application Priority Data

Aug. 31, 1968 Japan....................................43/62674
Nov. 9, 1968 Japan....................................43/82001

[52] U.S. Cl. .........................................................195/66 A
[51] Int. Cl. .......................................................C12d 13/10
[58] Field of Search ................................................195/66 A

[56] References Cited

UNITED STATES PATENTS 3,542,647  11/1970  Ho et al. ....................................195/66

OTHER PUBLICATIONS

Chemical Abstracts Vol. 69, 17095g (July 29, 1968)
Peterson et al., Applied Microbiology Vol. 17 p. 929– 930, June 1969

*Primary Examiner*—Lionel M. Shapiro
*Attorney*—Harry C. Bierman, Jordan B. Bierman and Bierman & Bierman

[57] ABSTRACT

Process for preparing asparaginase having a strong anti-tumor activity which comprises cultivating an asparaginase-producing micro-organism belonging to Achromobacter, Alcaligenes, Micrococcus, Proteus or Bacterium genera in a nutrient medium under aerobic conditions and recovering the accumulated asparaginase from the fermentation broth.

9 Claims, No Drawings

ASPARAGINASE HAVING ANTI-TUMOR ACTIVITY AND PROCESS FOR PREPARING THE SAME

The present invention relates to asparaginase having an anti-tumor activity and a process for preparing the same.

As is well known, asparaginase is an enzyme acting as a catalyst in the hydrolysis of asparagine to aspartic acid and ammonia and can be produced by various bacteria such as *Escherichia coli*, Bacillus, Pseudomonas, Salmonella, *Aerobacter aerogenes*, *Bacterium cadaveris*, *Brucella abortus*, *Leuconostoc mesenteroides*, *Pasteurella tularensis*, *Serratia marcescens* and the like. The asparaginase produced by *Escherichia coli* or *Serratia marcescens* is known to show an anti-tumor activity. The administration thereof for a long time usually causes the production of an anti-body in the living host body. Because of this, there has heretofore been a need for a new asparaginase having anti-tumor activity different from the asparaginase known to the prior art.

It has now been found that certain kinds of bacteria produce asparaginase having a strong anti-tumor activity in a high yield when cultivated in a nutrient medium under aerobic conditions. This finding is both unexpected and surprising, because while the cultivation of the known micro-organisms producing asparaginase having an anti-tumor activity under aerobic conditions affords good growth of the micro-organisms it suppresses markedly the production of the desired asparaginase. Thus, cultivation of the known micro-organisms for the production of asparaginase has been carried out only under anaerobic conditions.

Accordingly, a basic object of the present invention is to produce asparaginase having a strong anti-tumor activity. Another object of this invention is to provide a process for preparing such asparaginase in a commercially satisfactory yield. A further object of the invention is to provide a process for production of active asparaginase by the use of certain kinds of bacteria. These and other objects will be apparent to those conversant with the art to which the present invention pertains from the following descriptions.

According to the present invention, the desired asparaginase is produced by cultivating an asparaginase-producing micro-organism belonging to the Achromobacter, Alcaligenes, Micrococcus, Proteus or Bacterium genera in a nutrient medium under aerobic conditions and recovering the accumulated asparaginase from the fermentation broth.

As the micro-organisms to be used, there may be specifically selected Achromobacter candicans OUT (Faculty of Engineering, Osaka University, Japan) No. 8005, *Alcaligenes faecalis* OUT No. 8027, *Micrococcus ureae* IFO (Institute for Fermentation, Osaka, Japan) No. 3767, Proteus vulgaris OUT No. 8226, *Bacterium cadaveris* ATCC (American Type Culture Collection, U.S.A.) No. 9760, etc. All these micro-organisms are publicly available from the collections stated above.

The nutrient medium may comprise carbon sources (e.g. glucose, fructose, maltose, lactose, citric acid, fumaric acid), nitrogen sources (e.g. corn steep liquor, yeast extract, peptone, polypeptone, casein hydrolysate, amino acid) and inorganic salts (e.g. sodium chloride, potassium phosphate, magnesium sulfate). Thus, the nutrient medium may be a conventional one employed for cultivation of bacteria. The addition of an amino acid such as asparagine or glutamine is particularly preferred for increasing the yield of asparaginase.

The cultivation may be carried out aerobically at about 25° to about 40° C. under pH 5 to 9 for about 15 to about 72 hours while shaking or under submerged conditions. The optimum conditions for the composition of the nutrient medium, the cultivation temperature, the cultivation time and the like may be properly determined based on the kind of micro-organism employed.

As a result of the cultivation as set forth above, the asparaginase is accumulated in the fermentation broth, particularly in the bacterial cells. To recover the asparaginase from the cells, various known procedures for obtaining enzymes from micro-organisms may be employed. For example, the bacterial cells are ground with quartz sand and the broken cells extracted with water or an aqueous solution of salt. Alternatively, the bacterial cells are subjected to ultrasonic treatment. Also, the bacterial cells can be treated with a bacteriolytic enzyme such as lysozyme and the resultant cells extracted with water or an aqueous solution of salt in the presence of a surface active agent. Still another method is to freeze and thaw the bacterial cells, followed by extraction of the broken cells with water or an aqueous solution of salt. The foregoing is intended to be illustrative only.

The asparaginase solution thus obtained is then purified in a conventional manner. For example, salting out the enzyme with a salt such as ammonium sulfate; precipitating the enzyme with an organic solvent such as alcohol or acetone; removing nucleic acid using protamine, streptomycin, magnesium ion or the like; column chromatography using ion exchange material such as ion exchange resin or ion exchange cellulose; gel filtration using "Sephadex" (dextran) or "-Biogel" (polyacrylamide); electrophoresis, etc. Other equivalent methods will suggest themselves to those skilled in the art.

The asparaginase obtained by the present invention is, as stated above, highly active in suppressing tumors. The test results as hereinafter described clearly support such activity.

TEST METHOD

Three groups of C3H mice, each group consisting of nine mice, were implanted with 10 million 6C3HED tumor cells intraperitoneally. After 24 hours, asparaginase (6.7 I.U.) dissolved in an aqueous solution of sodium bicarbonate was administered to the mice. The survival time of the treated animals was compared with that of the control animals which were given an aqueous solution of sodium bicarbonate containing no enzyme.

RESULTS

The results are shown in the following table:

TABLE I

| Group | Number of animals tested | Survival time (days) |
| --- | --- | --- |
| Control | 9 | 12, 12, 12, 12, 12, 12, 12, 13, 13 |
| Medicated asparaginase from Bacterium cadaveris | 9 | 16, 25, >180, >180, >180, >180, >180, >180, >180 |
| Medicated asparaginase from Proteus vulgaris | 9 | 19, 30, 43, >180, >180, >180, >180, >180, >180 |

From this table, it can easily be seen that the animals given the asparaginase of this invention survived for much longer time than the control animals. In fact, some treated animals lived over 15 times as long as the untreated ones.

Practical embodiments of this invention are illustratively shown in the following Examples, in which percent is weight per volume.

EXAMPLE 1

Two hundred milliliters of an aqueous nutrient medium having a pH of 7.0 is inoculated with an asparaginase-producing micro-organism. The medium contains 1 percent meat extract; 1 percent polypeptone, 1.25 percent yeast extract, 1 percent glucose, 0.5 percent sodium chloride and 0.2 percent L-asparagine (0.2 percent). Cultivation takes place at 30° C. with shaking for 16 hours. The fermentation broth is centrifuged to collect the bacterial cells. The cells are suspended in 40 ml. of distilled water and subjected to ultrasonic vibration at 10 kilocycles for 10 minutes. After centrifuging, the asparaginase is found in the supernatant liquid.

0.5 ml. of the supernatant liquid is incubated with M/20 borate buffer (pH 8.4) or M/20 acetate buffer (pH 5.0) (1 ml. and 0.5 ml of 0.04 M asparagine solution at 37° C for 30 minutes. The amount of ammonia liberated is determined by the indophenol method. Defining the enzymatic activity producing one micromol of ammonia per minute as 1 I.U. (International Unit), the results are shown in the following Table:

TABLE

| Micro-organism | Asparaginase activity (I.U./200 ml. of fermentation broth) | |
|---|---|---|
| | pH 8.4 | pH 5.0 |
| Achromobacter candicans OUT No. 8005 | 33.8 | 2.2 |
| Alcaligenes faecalis OUT No. 8027 | 67.0 | 0.6 |
| Micrococcus ureae IFO No. 3767 | 36.0 | 1.0 |
| Proteus vulgaris OUT No. 8226 | 72.0 | 50.8 |

EXAMPLE 2

Bacterium cadaveris ATCC No. 9760 is cultivated in 200 ml. of an aqueous nutrient medium such as that set forth in Example 1 at 30° C. for 16 to 48 hours while shaking under aerobic conditions. After cultivation, the bacterial cells are collected by centrifuging, suspended in 40 ml. of distilled water and subjected to ultrasonic treatment at 10 kilocycles for 10 minutes. The supernatant liquid obtained by centrifuging the broth after the same treatment is subjected to a determination of enzymatic activity in the same manner as is described in Example 1. The results are shown in Table II, in which the oxygen absorption rate is the number of millimoles of oxygen absorbed by one liter of the nutrient medium per minute.

TABLE II

| Composition | Oxygen absorption rate, millimole | Cultivation time, hour | Asparaginase activity, I.U./200 ml. of fermentation broth |
|---|---|---|---|
| Meat extract, 1% | 0 | 24 | 11.6 |
| Peptone, 1%; yeast extract, 1.25%; sodium chloride, 0.5%; glucose, 1%; L-asparagine, 0.2% | 0.5 | 16 | 61.4 |
| | | 24 | 83.2 |
| | | 48 | 94.2 |
| | 1.0 | 24 | 86.8 |
| | 1.4 | 16 | 98.6 |
| | | 24 | 82.4 |
| | | 48 | 82.4 |
| | 2.0 | 24 | 90.0 |
| Peptone, 2%; soldium glutamate, 0.5% | 0.5 | 24 | 20.0 |
| Yeast extract, 2% | 0.5 | 24 | 55.4 |
| Corn steep liquor, 5% | 0.5 | 24 | 33.6 |

EXAMPLE 3

Ten liters of a nutrient medium having a pH of 7.0 is charged into a jar fermenter. The medium contains 100 g. of meat extract, 100 g. of polypeptone, 125 g. of yeast extract, 100 g. of glucose, 50 g. of sodium chloride, 20 g. of L-asparagine and 5 g. of sodium hydroxide. After sterilization, the medium is inoculated with Alcaligenes faecalis OUT No. 8027 and fermentation is carried out at 30° C. with aeration at a rate of 10 l./minute under agitation at 300 r.p.m. for 18 hours. The fermentation broth is centrifuged to collect the bacterial cells. The bacterial cells are suspended in 1 liter of distilled water, subjected to ultrasonic treatment at 20 kilocycles for 1 hour and centrifuged. Fifty milliliters of 1 M manganese chloride solution is added to the supernatant liquid containing asparaginase (17,200 I.U. at pH 8.4). The precipitate is removed by centrifuging. To the supernatant liquid is added 304 g. of ammonium sulfate, and the precipitate is collected, dissolved in distilled water and dialyzed for 24 hours. The dialysate is then purified by DEAE-cellulose column chromatography. The fractions having asparaginase activity are collected, dialyzed for 48 hours and lyophilized to give purified asparaginase (7,120 I.U. at pH 8.4).

EXAMPLE 4

Ten liters of the nutrient medium of Example 3 is introduced into a jar fermenter and, after sterilization, is inoculated with Proteus vulgaries OUT No. 8226. Fermentation is carried out at 30° C. with aeration at a rate of 10 l./minute under agitation at 300 r.p.m. for 20 hours. The fermentation broth is centrifuged to collect the bacterial cells. The bacterial cells are suspended in 1 liter of distilled water, subjected to ultrasonic treatment at 10 kilocycles for 1 hour and centrifuged. Fifty milliliters of 1 M manganese chloride solution is added to the supernatant liquid containing asparaginase (5,200 I.U. at pH 8.4; 3,500 I.U. at pH 5.0), and the precipitate is removed by centrifuging. To the supernatant liquid is added 418 g. of ammonium sulfate (418 g.) and the resultant precipitate is removed by centrifuging. One hundred ninety grams of ammonium sulfate is added to the supernatant liquid, and the precipitate is collected by centrifuging. The precipitate is dissolved in distilled water and dialyzed for 24 hours. The dialysate obtained is purified by DEAE-cellulose column chromatography. The fractions having asparaginase activity are collected, dialyzed for 48 hours and lyophilized to give purified asparaginase (2,340 I.U. at pH 8.4).

EXAMPLE 5

Ten liters of the same nutrient medium as in Example 3 is charged into a jar fermenter. The medium, after sterilization, is inoculated with Bacterium cadaveris ATCC No. 9760, and fermentation is carried out at 30° C. with aeration at a rate of 10 l./minute under agitation at 300 r.p.m. for 24 hours. The fermentation broth is centrifuged to collect the bacterial cells. The bacterial cells are suspended in 1 liter of distilled water, subjected to ultrasonic treatment at 20 kilocycles for 1 hour and centrifuged. 50 ml of 1 M manganese chloride solution is added to the supernatant liquid containing asparaginase (4,500 I.U. at pH 8.4), and the precipitate is removed by centrifuging. To the supernatant liquid is added 304 g. of ammonium sulfate, and the resulting precipitate is removed by centrifuging. 304 g. of ammonium sulfate is added to the supernatant liquid, and the precipitate formed is collected by centrifuging. The precipitate is dissolved in distilled water and dialyzed for 24 hours. The dialysate obtained is purified by DEAE-cellulose column chromatography. The fractions having asparaginase activity are collected, dialyzed for 48 hours and lyophilized to give purified asparaginase (2,160 I.U. at pH 8.4).

What is claimed is:

1. A process for preparing asparaginase having an antitumor activity which comprises cultivating an asparaginase-producing micro-organism belonging to Achromobacter, Alcaligenes, Micrococcus or Proteus genera in a nutrient medium under aerobic conditions and recovering the accumulated asparaginase from the fermentation broth.

2. A process according to claim 1 wherein said micro-organism is taken from the class consisting of *Achromobacter candicans, Alcaligenes faecalis, Micrococcus ureae,* and *Proteus vulgaris.*

3. The process according to claim 1, wherein the cultivation is carried out at about 25° to about 40° C. under pH 5 to 9 for about 15 to about 72 hours.

4. The process according to claim 1, wherein the micro-organism is *Achromobacter candicans.*

5. The process according to claim 1, wherein the micro-organism is *Alcaligenes faecalis.*

6. The process according to claim 1, wherein the micro-organism is *Micrococcus ureae.*

7. The process according to claim 1, wherein the micro-organism is *Proteus vulgaris*.

8. A process according to claim 7 wherein said micro-organism is *Proteus vulgaris* OUT No. 8226.

9. A process according to claim 8 wherein the cultivation is carried out at about 25° to about 40° C. under pH 5 to 9 for about 15 to 72 hours.

* * * * *